United States Patent [19]

Matthews, III et al.

[11] Patent Number: 5,677,708
[45] Date of Patent: Oct. 14, 1997

[54] SYSTEM FOR DISPLAYING A LIST ON A DISPLAY SCREEN

[75] Inventors: Joseph H. Matthews, III, Redmond; JoGene Kapell, Bellevue; Keith Lindsey Rowe, Seattle, all of Wash.

[73] Assignee: Microsoft Corporation, Redmond, Wash.

[21] Appl. No.: 435,292

[22] Filed: May 5, 1995

[51] Int. Cl.⁶ .................. H04N 7/173; G09G 3/02
[52] U.S. Cl. .................. 345/115; 345/123; 348/906; 348/7
[58] Field of Search .................. 345/115, 116, 345/123, 124; 348/906, 7, 12, 13; 455/4.2, 158.5; 395/155; H04N 7/173

[56] References Cited

U.S. PATENT DOCUMENTS

| | | | |
|---|---|---|---|
| 5,196,838 | 3/1993 | Meier et al. | 345/115 |
| 5,479,266 | 12/1995 | Young et al. | 348/906 |
| 5,495,267 | 2/1996 | Fujitaka | 345/123 |
| 5,532,754 | 7/1996 | Young et al. | 348/906 |

FOREIGN PATENT DOCUMENTS

| | | |
|---|---|---|
| WO 92/04801 | 3/1992 | WIPO . |
| 95/01058 | 1/1995 | WIPO .................. H04N 7/16 |

*Primary Examiner*—Wendy Garber
*Attorney, Agent, or Firm*—Jones & Askew

[57] ABSTRACT

A system for displaying a list of items containing information or alternative choices associated with a subscriber service of an interactive network system. At least one item in the list is displayed in its entirety. The items at the border of the list are only partially displayed to give the user an indication that the list extends beyond the borders of the list. Additional list items can be displayed by scrolling the list by manipulating a directional control on a remote control unit that operates in conjunction with a set-top terminal of the interactive system. An item in the list, or another control object on the display screen, is highlighted in a manner to give the user a visible indication that the list can be scrolled, or shifted, within the display to display new items in the list and remove previously displayed items.

44 Claims, 7 Drawing Sheets

SYSTEM FOR DISPLAYING A LIST ON A DISPLAY SCREEN

TECHNICAL FIELD

The present invention relates generally to interactive network systems and, more specifically, to an interactive network system for displaying a list containing multiple items on a display screen.

BACKGROUND OF THE INVENTION

Cable television systems, sometimes referred to as community-antenna television (CATV) systems, are broadband communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60-65% of all households actually being connected to such communications networks. While cable systems originally had very simple architectures and provided a limited number of different television signals, the increase in the number of television broadcasters, owners, and services over the last several decades has resulted in much more complex modem cable distribution systems.

A typical CATV system for the delivery of television programming to subscribers comprises three main elements: a headend, a distribution system, and subscriber drops.

The "headend" is a signal reception and processing center that collects, organizes and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes the these signals to individual neighborhoods for delivery to subscribers. A modem distribution system typically comprises a combination of coaxial cable and optical fibers with trunk amplifiers periodically spaced to compensate for attenuation of the signals along the line.

"Subscriber drops" are taps in the distribution system that feed individual 75 Ω coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. For downstream transmissions, typical CATV systems provide a series of video channels, each 6 MHz in bandwidth, which are frequency division multiplexed across the forward band, in the 50 MHz to 550 MHz region of the frequency spectrum. As optical fiber more deeply penetrates the service areas with hybrid optical fiber/coaxial cable (HFC) configurations, the bandwidth of the coaxial cable portion is expected to increase to over 1 GHz, thereby increasing the number of available channels for potential services.

The advent of pay-per-view services and other interactive television applications has fueled the development of bidirectional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having HFC configurations, multiple service operators (MSOs) can use the additional channels gained by this wider bandwidth network to provide many new subscriber services. This ever-expanding deployment of fiber optic technology supports the implementation of an "interactive network" to allow a subscriber to obtain desirable service of programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

The delivery of a variety of interactive services via a broadband network distribution system raises the critical issue of defining an efficient mechanism for presenting both operation and program-related information to an audience of possible consumers representing diverse technological backgrounds and interests. From an ergonomic perspective, this "user interface" for such an interactive network should appeal to a "typical" viewer of standard broadcast television programs and should be easy for this mythical person to understand and use. Because computer users reflect only a portion of the overall audience for interactive services, it is desirable that the features of this user interface be based upon the assumption that the typical viewer is not familiar with user interface customs that are otherwise acceptable and understood by the computer-literate community. In addition, the functions of the user interface should be controllable with a control device familiar with this typical television viewer, such as a handheld remote control. This user interface also should be readily readable from an acceptable viewing distance that typically separates the viewer from a television screen.

The typical television viewer is accustomed to viewing sophisticated graphics for broadcast programs that are produced with complex and expensive production equipment. It is desirable for the user interface of an interactive network to support similar graphical features, including visual objects having a 3-dimensional appearance, image transition effects such as wipes, dissolves, and rambles, and a variety of colors and fonts. This user interface also preferably supports active animation of displayed objects to entertain the viewer and to focus the viewer's attention upon a particular object for controlling a feature of the user interface. The user interface also should be sufficiently flexible in appearance to allow a service provider to design and implement objects having a unique appearance for different applications, thereby permitting a user to distinguish these applications.

From a technical perspective, the delivery of video signals for presentation by a conventional television screen is limited by the display screen variations in the numerous models of televisions and the limitations inherent in the National Television Systems Committee (NTSC) standards for formatting video signals. The NTSC has established title and video safety standards to define a space along the television screen for readable text and images. The area of the television screen that is considered to support the most reliable presentation of images, which is known as the "safe title" zone, is approximately the center 80% of the horizontal and vertical space of a television screen. Likewise, the area of the television screen that is considered to support the most reliable presentation of moving images, which is known as the "safe action" zone, is approximately the center 90% of the horizontal and vertical space of a television screen.

Because these NTSC standards suggest that the video performance of even modern television monitors suffers from horizontal and vertical drift problems, the user interface for an interactive network should support the video safety standards to ensure that objects intended for display are actually presented to the viewer. However, it will be appreciated that this implementation also effectively reduces "usable screen space" or display resolution for the user interface. This is dramatically different from the computer environment, where the entire screen of a computer monitor can predictably be used to present static and dynamic objects to a user.

The design of the user interface for an interactive network also must consider the well known phenomenon of "flicker" arising from the scanning of vertical and horizontal scan lines in a television screen. It would be desirable for the objects of a user interface for the interactive network to be drawn with lines having a pixel width of more than one pixel to reduce flicker and to support a more readable presentation of the displayed objects.

In summary, for an interactive network environment, there is a need for a user interface having simplified user interface controls that are optimized for the television environment in both appearance and behavior. The user interface should be entertaining and have the look of a television program. The controls of the user interface are preferably operable with a handheld control device, such as a remote control. The user interface should support NTSC video safety standards to ensure that objects intended for display are actually presented to the viewer in a manner that is easily readable on a variety of conventional television sets. The present invention addresses these issues by providing a user interface designed for use in the environment of an interactive network.

The many subscriber services supported by interactive networks give the user the ability to choose desired programming or viewing options. The range of possible options associated with each service is typically displayed to the user on the television screen in some form of list such that the user can visually observe the available choices. The user then selects the desired choice via a remote control unit or other similar device.

The various alterative choices associated with a subscriber service are usually displayed to the user on the television display screen in the form of a list. The list is typically contained with a box or other control object with distinct boundaries or borders. Lists can, and usually do, contain more items than can be shown on the display screen at any one time. Thus, the user must scroll through the list, i.e., cause new items in the list to be displayed on the display screen while causing old items previously displayed to be removed from the display. Scrolling is usually accomplished by providing arrows, buttons, or other visible indicators on the screen that the user may manipulate via a remote control or other device to cause the list to be shifted within the control object on the display screen.

The items displayed in the list are typically shown in their entirety. Thus, the first and last items displayed in the control object, i.e., those items displayed at the border of the control object, are completely displayed. This manner of display of list items creates a recognition problem for the user in that the display of border items in their entirety does not provide the user with any visual indication that additional items are contained, but are not yet displayed, in the list. One method of providing the user with such an indication is to display an arrow or other visual indicator, such as a scroll bar, that communicates to the user that other items are contained in the list but are not shown on the display screen. However, this method does not allow the user to recognize instinctively that the list extends beyond the items displayed, i.e., the display of the item itself does not provide a visual indication to the user that additional list items exist beyond those displayed.

Additionally, the variation in the size of the safe title and safe action zones of television screens creates problems for lists displaying items in their entirety. First, the display of list items at or near the border of the display screen in their entirety cannot be guaranteed due to the variation is safe zones. Thus, certain items in the list may not be properly displayed. Second, the display of any visual indicator near the border of the control object on the screen to alert the viewer of additional list items cannot be guaranteed. Thus, the user may be left without any means of instinctively recognizing that additional list items exist beyond those displayed on the screen.

SUMMARY OF THE INVENTION

The present invention provides a system for displaying a list of items in a control object on a television display screen in association with an interactive network system. At least three items are displayed in the control object, which extends between the borders of the screen. The first and last items of the list are only partially displayed so that the user can instinctively recognize that additional list items exist beyond those displayed. The list is displayed in a control object that spans the entire display screen and can be oriented horizontally, vertically, or in a two-dimensional grid arrangement.

The user can scroll through items in the list by manipulating a directional control on a remote control unit. The user can manipulate the directional control on the remote control to put a focus frame on an item completely displayed in the control object. The user can then use the directional control on the remote control to shift the list items displayed in the control object such that new items are displayed and old items are removed from the display.

Thus, it is an object of the present invention to provide a system for displaying a list of items in a control object on a display screen.

It is another object of the present invention to provide a system for displaying a list of items in a control object that is guaranteed to be only partially displayed.

It is a further object of the present invention to only partially display the first and last items in the control object.

It is a still further object of the present invention to display a list of items in a control object such that provides the user with an instinctive indication that additional items exist beyond those displayed in the control object.

Other objects, features, and advantages of the present invention will become apparent upon reading the following specification, when taken in conjunction with the drawings and the appended claims.

DETAILED DESCRIPTION OF THE PREFERRED EMBODIMENT

Figure 1:
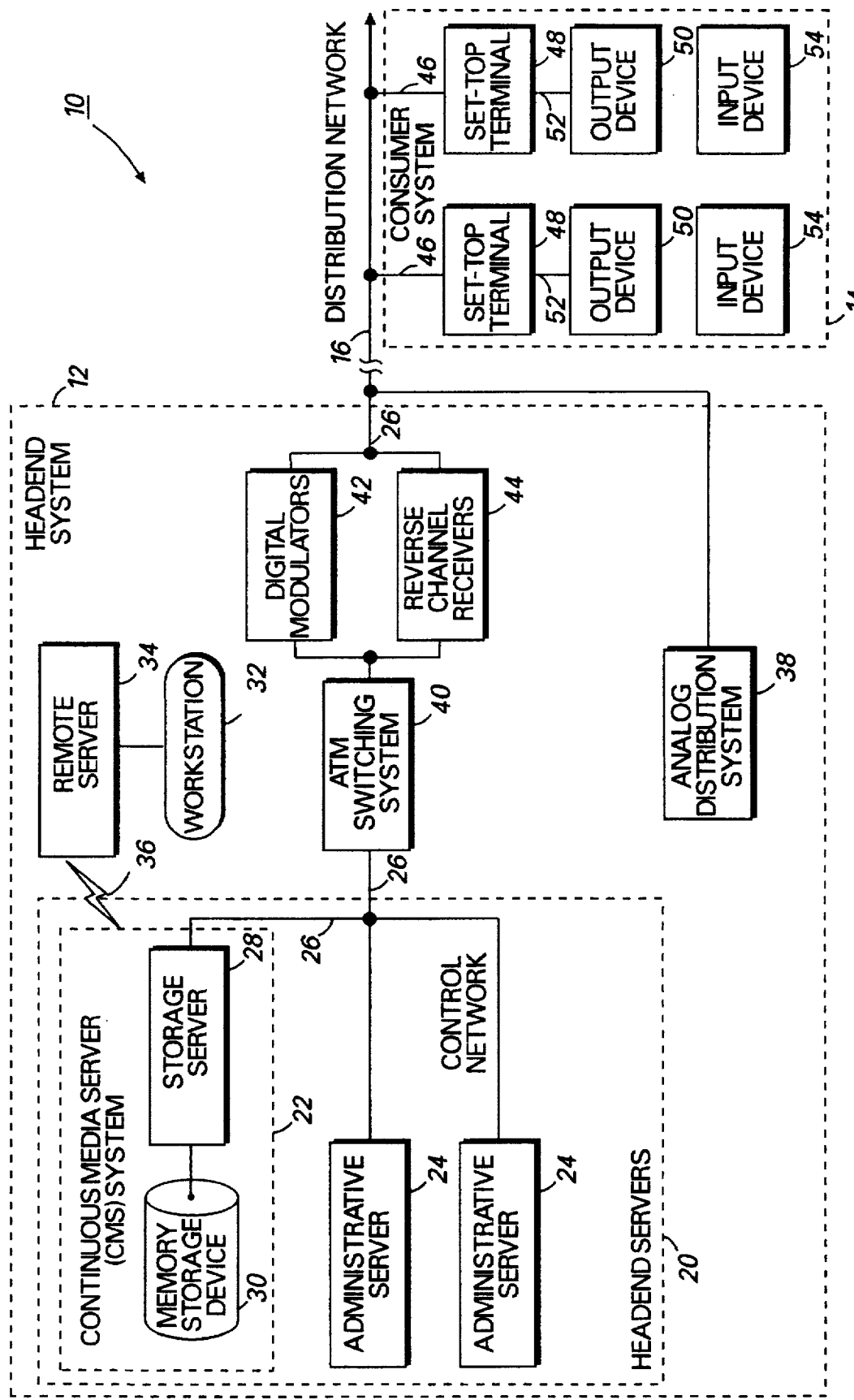
FIG. 1 is a block diagram of the operating environment for an interactive network system.

Turning next to the figures, the preferred embodiment will now be described in detail. The present invention is directed to a system for displaying a list of available options on a display screen in connection with a subscriber service of an interactive network system. Although the preferred embodiment of the present invention will be described with respect to subscriber services displayed to a user on a television display screen, those skilled in the art will recognize that the present invention may be utilized in connection with other forms of communications media and other output display devices.

In general, the present invention provides a system for displaying a list of multiple items containing information or alternative choices associated with a subscriber service of an interactive network system. At least one item in the list is displayed in its entirety. The items at the border of the list are only partially displayed to give the user an indication that the list extends beyond the borders of the list. Additional list items can be displayed by scrolling the list by manipulating a directional control on a remote control unit that operates in conjunction with a set-top terminal of the interactive system. An item in the list, or another control object on the display screen, is highlighted in a manner to give the user a visible indication that the list can be scrolled, or shifted, within the display to display new items in the list and remove previously displayed items.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

The preferred embodiment of the present invention is directed to a user interface for an interactive network system that can deliver a variety of services, including entertainment, information, and transaction services, to consumers via an interactive broadband network. This user interface, which is typically presented via an output device, such as a display or monitor, can include one or more control items or images representing various control functions associated with the operation of the interactive network. For example, the user interface can include control items representing functions for controlling a display of available program options. The present invention provides a system for both "highlighting" the currently selected control item and for supplying the user with an indication of other control items that are available for selection by the user. The innovative solution provided by this system addresses the requirements of limited display "real estate" for displaying such control images, as well as the dynamic nature of programming information presented by the interactive network.

Although the preferred embodiment will be generally described as an interactive television system for delivering broadcast television programs and related information, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Likewise, those skilled in the art will also appreciate that the present invention can be extended to communicating control information within the general purpose computing environment. Specifically, the present invention supports user interfaces for displaying control information with general purpose computer systems, including desktop computers, portable computers, and handheld computers, including personal digital administrators.

Turning now to the drawings, in which like numerals indicate like elements throughout the several figures, FIG. 1 illustrates the operating environment for an interactive network system. Referring to FIG. 1, the interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a worldwide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bidirectional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributed by the headend system 12 and to (2) transmit requests or instructions to the headend system 12. For example, the set-top terminal 48 can accept and convert signals carrying programming information to a format compatible for presentation by an output device 50, such as a television or a computer system. This output device 50, which can be connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a handheld control, a keyboard, a mouse device, a game control, a joystick, a pen or stylus, a trackball, or a track pad.

For the preferred embodiment, the input device 54 is implemented as a handheld remote control capable of transmitting infrared signals carrying commands for controlling the operation of the set-top terminal 48. The remote control can include a directional keypad having distinct keys, or a joystick, for allowing the user to control direction (up, down, left, right) and relative changes in volume or channel (increase or decrease), as well as absolute changes to channel value via a numeric key pad. The remote control and its functions are more fully described with respect to FIG. 3.

Figure 2:
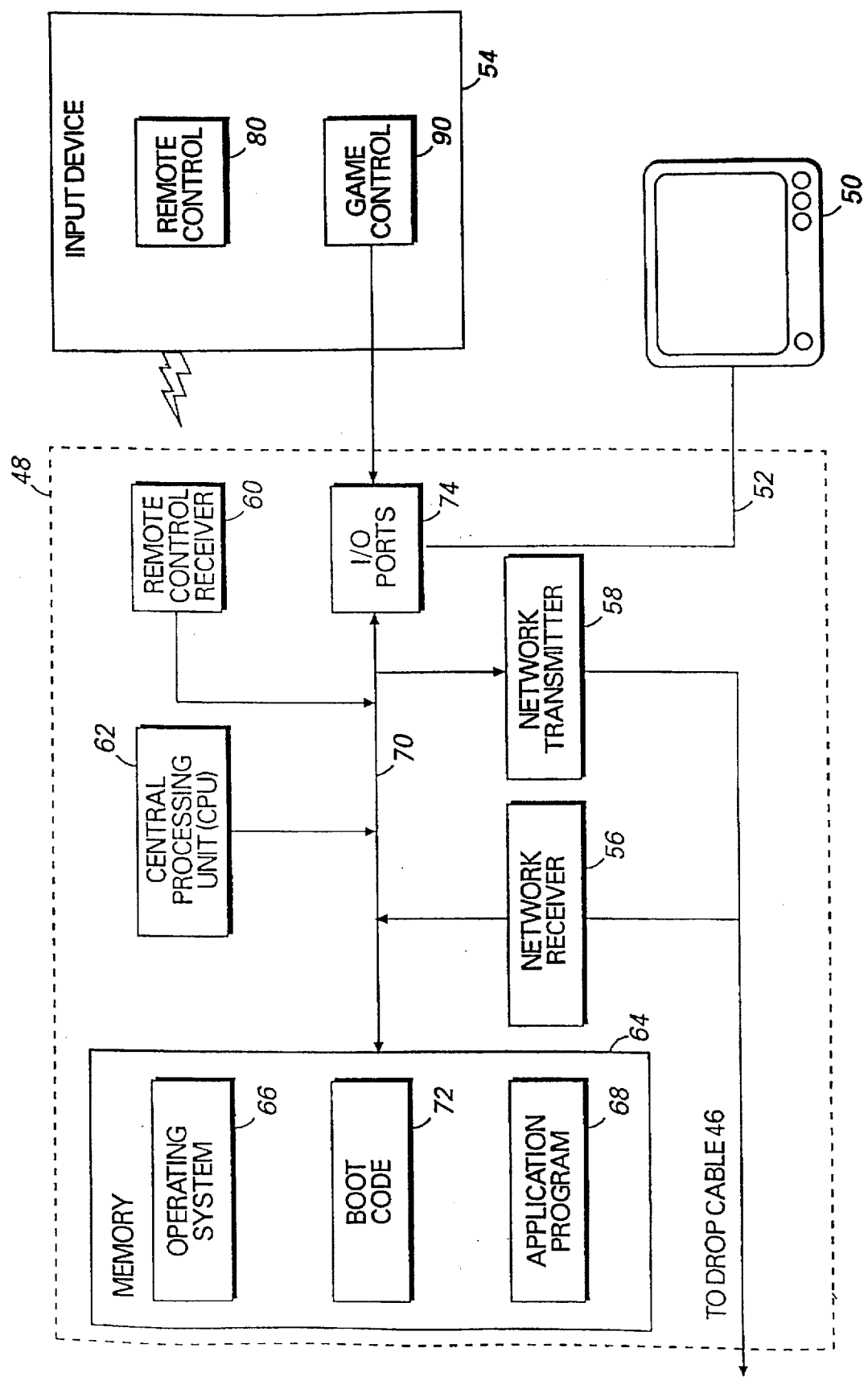
FIG. 2 is a block diagram of the basic components of a set-top terminal.

FIG. 2 illustrates the basic components of the set-top terminal 48. Turning now to FIGS. 1 and 2, the primary components for the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 50, such as a remote control 80.

The CPU 62, which is connected to the network receiver and transmitter 56 and 58, as well as to the remote control receiver 60, controls the operations of the set-top terminal 48 and supports the rendering of graphical images of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bidirectional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item is any visual image that can be manipulated by the user to perform an operation. The operating system 66 can receive and interpret input data supplied by the input device 54, as received by the remote control receiver 60. As will be described in more detail below with respect to FIG. 3, a user can "select" and "launch" control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control 80. In this stand-by mode, the set-top terminal can communicate with the headend system and can respond to administrative requests transmitted by the headend system 12. In the event that a user tunes to an interactive channel (typically by pressing the appropriate function key of the remote control), the set-top terminal 48 changes modes and enters the active mode. In the active mode, the set-top terminal 48 communicates with the headend system 12 to process the instructions transmitted by the remote control. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display.

In accordance with the present invention, the output device 50, in connection with an interactive network system 10, displays information on a display of the output device 50, preferably a television display screen, as shown in FIGS. 4–10. The various subscriber services may provide information to the user via the display screen in the form of a list of choices from which the user may choose various programs or movies to view. An example of such a service is Video on Demand (VOD) or Movies on Demand (MOD), in which the user manipulates the remote control to signal the set-top terminal to display a screen containing a list of items in a display object in addition to other display objects associated with the service. The user then may manipulate the remote control to signal the set-top terminal to select a desired movie for viewing on the display screen.

The present invention involves the display of items in a list. It should be understood that the present invention is not limited to the display of movies for Video on Demand or Movies on Demand subscriber services, but is applicable to any subscriber service in which a list of items is displayed on the display screen for manipulation by the user of the interactive system. Those skilled in the art will understand that the list may include items displayed as text, graphics, video, or any other suitable display capable of distinguishing an item to the user.

Figure 3:
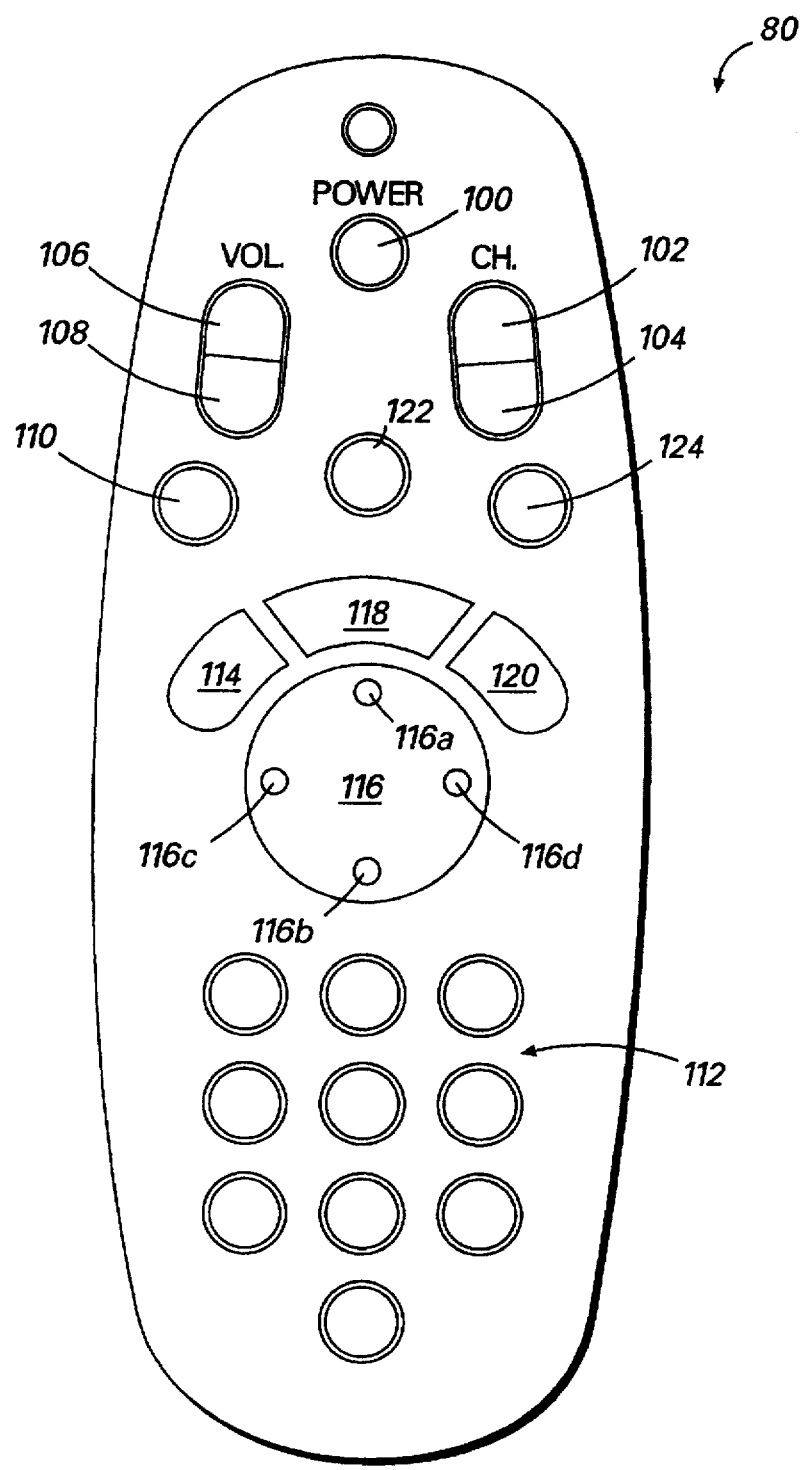
FIG. 3 shows the face of a remote control unit for communicating with the set-top terminal.

The preferred embodiment of the present invention utilizes a remote control 80, shown in FIG. 3. It should be understood that the present invention is not limited to the use of the remote control unit shown in FIG. 3, but can be utilized with any suitable remote control unit. Similarly, the user can manipulate the control objects displayed via buttons, knobs, or other control mechanism on the set-top terminal itself rather than the remote control. Thus, it should be understood that the remote control is the preferred method by which the user communicates with the set-top terminal to manipulate objects on the display screen and initiate action of the interactive system, but that any suitable method of communication with the set-top terminal will suffice.

FIG. 3 illustrates the preferred remote control unit 80, which is used to transmit commands to the set-top terminal 48. The remote control unit 80 includes a variety of keys that are common to remote control units for use with conventional television sets. These include power on/off 100, channel up 102, channel down 104, volume up 106, volume down 108, mute 110, and a 10 digit numeric keypad 112.

The preferred remote control unit also includes keys that are specifically related to the preferred interactive system. A menu button 114 is used to open and close on-screen menus, such as a channel manager object. A directional control 116 is a rocker switch that is used to manipulate the channel manager and select specific items by moving a cursor up, down, left or right. The directional control 116 can be moved in any of four positions: the up position 116a, the down position 116b, the left position 116c, and the right position 116d. An action button 118 is used to launch a selected function. A help key 120 is to initiate on-screen help. An "A" button 122 and "B" button 124 are used to select specific options that are provided in some contexts.

Figure 4:
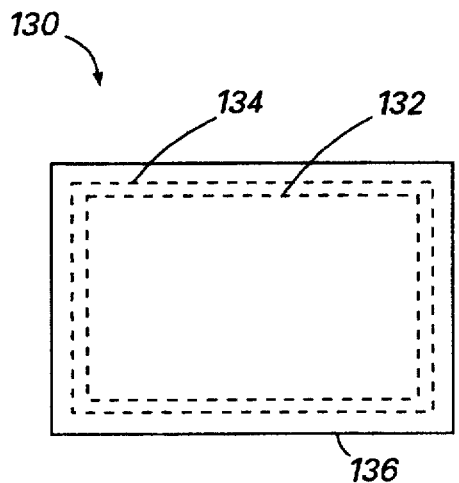
FIG. 4 is a diagram of the "safe title" and "safe action" zones of a television display screen.

The preferred embodiment of the present invention displays a list in a control object on the display screen of a convention television set, as shown in FIGS. 4–10. The display of video signals on conventional television sets is not guaranteed but is variable. The "safe title" zone includes the center 80% of the television screen and the "safe action" zone includes the center 90% of the television screen. This is shown in FIG. 4, which is not drawn to scale. The video signal to be displayed on the television display screen 130 is not guaranteed to be displayed in its entirety. The "safe title" zone 132 and "safe action" zone 134 are the areas of the display screen in which certain displays can be essentially guaranteed. Thus, in areas of the display screen 130 between the "safe title" zone 132 and the outer border of the display screen, video signals intended to be displayed cannot be guaranteed.

Figure 5:
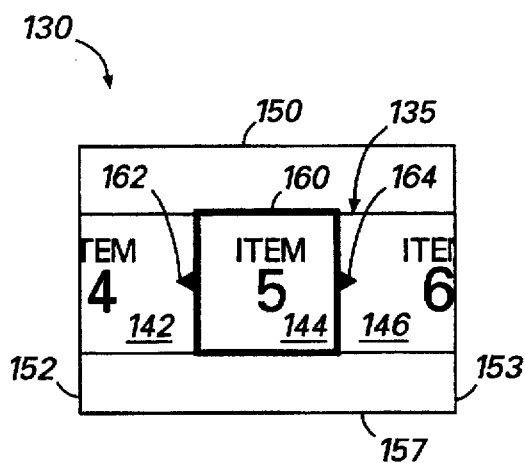
FIG. 5 is a list as shown on the display screen in accordance with the preferred embodiment of the present invention.

FIG. 5 illustrates the preferred presentation of a list on the display 130 of the output device 50. The display shown in FIG. 5 shows three different items 142, 144, 146 (Items 4, 5, and 6, respectively) displayed in the list, however, it should be understood that additional items may be displayed in the list. The list is displayed within a control object 135. The control object 135 in which the list is displayed can be manipulated by the user via a remote control or other suitable interface mechanism to perform operations corresponding to the items in the control object and the subscriber service being utilized.

The items in the list are displayed adjacent to one another in a horizontal arrangement in the center of the display screen. However, the present invention is not limited to a list displayed in a horizontal arrangement, and a list displayed in accordance with the present invention may be displayed in a vertical or other suitable orientation. Furthermore, the present invention is not limited to a list displayed in the center of the screen, but can display the list in any orientation in any position on the screen. However, the list shown in FIG. 5 should be displayed as much as possible within the "safe title" zone of the television display screen.

The display screen includes a top border 150, a bottom border 151, a left border 152, and a right border 153. When the list is not being scrolled, any item displayed at the border of the display is only partially displayed, as seen by Items 4 and 6 in FIG. 5. The partial display of border items intuitively communicates to the user that the list extends beyond the items displayed on the display screen. Thus, no additional arrows, icons, or other visible indicators are required to tell the user that the list contains additional items not revealed on the display.

Additionally, because the border items are only partially displayed, the display of the list in accordance with the present invention need not compensate for or consider the variation in television screen displays, as described with reference to the safety zones shown in FIG. 4. Therefore, the variation in the size of the display does not affect the list displayed in accordance with the present invention because the list items displayed at the boundary of the display are only intended to be partially displayed. The function of the partial display of items is to communicate to the user that list items exist beyond those currently displayed. Therefore, the extent of the partial display of the border items is essentially unimportant such that variations in the safe zones do not adversely affect the display of the partial scrolling list. The partial display of items in accordance with the present invention does not require that the entire item appear within the safety zone. Therefore, even including the possibility of variation in the size of the display screen, the inventive display list is guaranteed to provide partial visibility of the items displayed at the borders of the display screen.

The display of one item in the list is altered or modified in a manner to allow the user to recognize that that particular item can be selected to initiate the function associated with the item and the subscriber service being utilized. This highlighting feature is called "focus", and is illustrated in FIG. 5 as a focus frame 160 comprising a thick border around the periphery of the center item in the list, or any item in the list that is displayed in its entirety. The focus frame 160 functions to direct the user's attention to a particular item in the list and operates as an indication that the user can control and select the item in the focus frame to perform a function. It should be understood that the focus frame can utilize various features to demonstrate to the user that focus is on the particular item. In addition to, or in place of, the thickened border surrounding the item having focus, focus can be demonstrated by magnification, color, audio, animation, graphics, or any other feature that serves to differentiate the focus item from adjacent items.

As shown in FIG. 5, arrow tabs 162, 164 can be appended to the sides of the focus frame 160 to supply the user with a visual indication of the direction(s) that the user can scroll the items in the displayed list. The user can then operate the directional control 116 on the remote control 80 in one of the directions indicated by the arrow tabs on the focus frame to scroll the list in that direction.

Figure 6A:
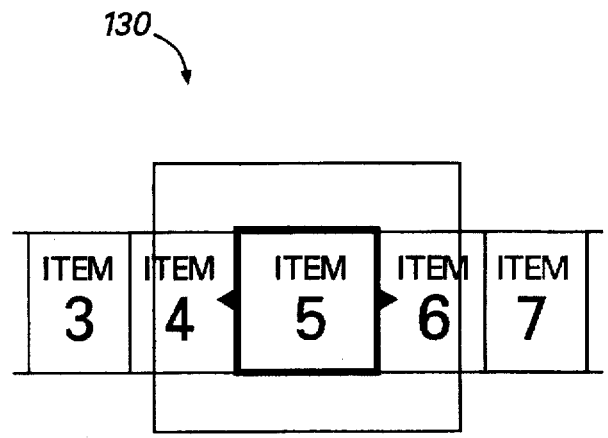
FIG. 6A shows a list as interpreted by the user in accordance with the present invention.
Figure 6B:
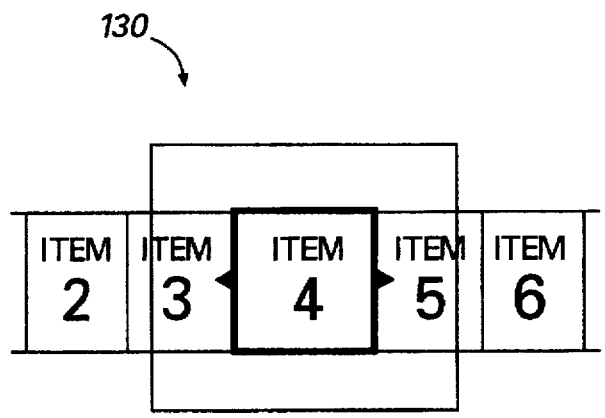
FIG. 6B shows the interpretation of the list in FIG. 6A after it has been scrolled one item.

For example, arrow tab 162 on focus frame 160 informs the user that the list can be scrolled to the left. When the user presses the direction control 116 to the left position 116c, as shown in FIG. 3, previously hidden items are revealed in one direction and previously visible items are obscured in the other direction. When the list is scrolled to the left, the items in the list displayed on the display screen 130 are shifted such that the item positioned immediately to the left of the item in the focus frame 160 is shifted into the focus frame. Additionally, all other list items are shifted accordingly. An example of the shifting of the entire list as it should be understood by the user is seen in FIGS. 6A and 6B. When the list of FIG. 6A is shifted, to the left, the items actually shift to the right such that the item immediately to the left of the focus frame is moved into the focus frame. The result is seen in FIG. 6B, where Item 4 now occupies the focus frame and the other items displayed on the display screen have been shifted one position. Preferably, the items "crawl" smoothly in unison toward the new positions, i.e., the items slide into the new positions relatively slowly such that the user can view the event over a small period of time. Alternatively, the items may "jump" from their old positions to their appropriate new positions, causing the user to view the change as essentially occurring instantaneously.

Figure 7A:
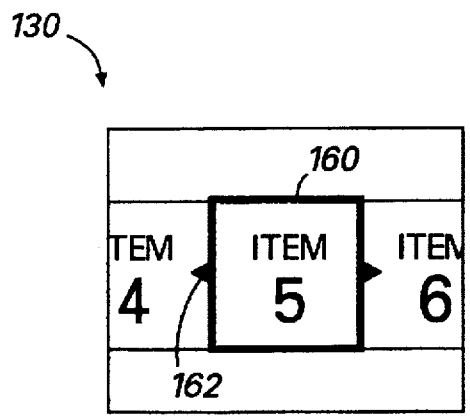
FIGS. 7A-C illustrates the display screen during scrolling of the list.
Figure 7B:
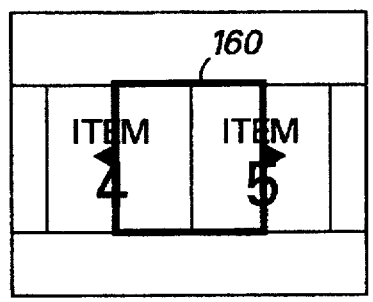
Figure 7C:
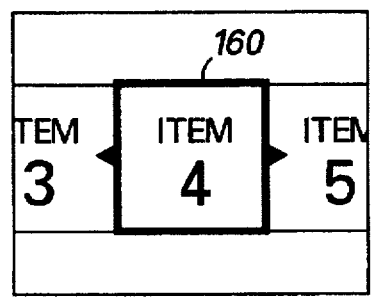

An example of the display screen as it would appear at a time during the "crawling" of items from old positions to new positions is illustrated in FIGS. 7A, 7B, and 7C. FIG. 7A shows the items of the list displayed on the display screen 130 prior to scrolling by the user. When the user presses the directional control 116 on the remote control 80 to the left position 116c, in accordance with arrow tab 162 on the focus frame 160, the items in the list are shifted to the right. Pressing the directional control 116 to the left position communicates to the set-top terminal that the user wishes the item immediately to the left of the focus frame to be shifted into the focus frame. Thus, the list is actually shifted to the right when the user commands the list to shift to the left. During the smooth crawling of items to the right, the screen will appear as shown in FIG. 7B. It should be understood that FIG. 7B shows the display screen at only one instance during the crawling of items from old to new positions, and the position of Item 4 relative to the focus frame 160 may change many times prior to Item 4 being moved from its old position to its new position within the focus frame. FIG. 7C shows the list as it would appear after all items in the list has been shifted one position to the right. Item 4 now fills the focus frame 160, and Items 3 and 5 are now partially displayed.

In the preferred embodiment, the focus frame is static and remains positioned in a constant location near the center of the display screen. When the user operates the remote control to scroll items displayed in the list, the focus frame remains in its position and items scroll through the focus frame. Thus, a new item will appear within the static focus frame every time the user scrolls through the list. An example of items scrolling through a static focus frame is seen in FIGS. 7A-C.

Figure 8:
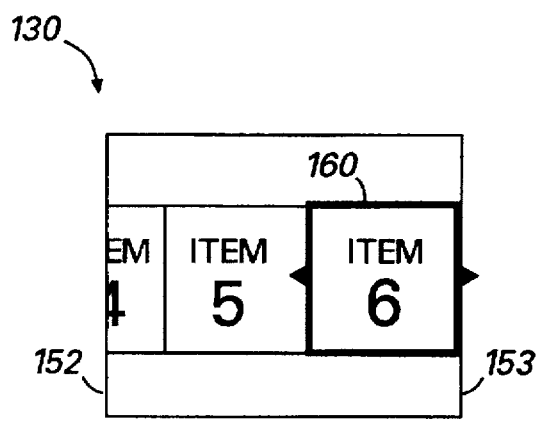
FIG. 8 shows a list employing a dynamic focus frame in accordance with another embodiment of the present invention.

However, in an alternative embodiment of the present invention, shown in FIG. 8, the focus frame is dynamic and can be moved along the length of the list to the border of the list, which is typically the left border 152 or right border 153 of the display screen 130. In this alternative embodiment, the focus frame is movable between the items displayed at the left and right borders of the display screen. In the display of FIG. 8, the user presses the directional control 116 of the remote control to the right position to move the focus frame 160 toward the right border 153 of the display screen 130. When the focus frame reaches the item displayed at the right border of the display screen, the focus frame stops in that position. Further manipulation of the directional control to the right position 116d on the remote control will cause the list to be shifted such that the item immediately to the right of the item in the focus frame, i.e., Item 7, is shifted into the focus frame.

The list is not shifted within the display screen until the focus frame is located at the border of the display screen and the user operates the remote control to scroll the list. The focus frame is locked at the border and is not removed from the screen when the user continues to operate the remote control to scroll in that direction. If the user operates the directional control 116 toward the left position 116c, the focus frame shown in FIG. 8 is moved toward the left border. The focus frame is first moved to the center item, Item 5 in FIG. 8, and then to Item 4, which will be displayed in its entirety within the focus frame at the border of the display. Thus, when the focus frame is dynamic, it can be moved between the boundaries of the display screen and the user can shift the list only when the focus frame is at a boundary.

When the user chooses a subscriber service to be utilized, a display associated with the service is displayed on the output device. It should be understood that additional control objects can be displayed on the display screen in addition to the control object 135 containing the list, as shown in FIG. 5. The user operates the directional control of the remote control to shift focus between any display objects displayed on the screen that can accept focus. Thus, the user positions focus on the list by manipulating the remote control until the focus frame is displayed on an item in the list. When the user has scrolled through the items in the list such that the desired item is positioned within the focus frame, the item may be selected by pressing the action button 118 on the remote control 80, as shown in FIG. 3. Pressing the action button causes the item within the focus frame to be selected and the appropriate function to be executed by the interactive network. For example, if the subscriber service is Movies on Demand, the list may display items of movie titles. The user can scroll the list until the desired movie title appears within the focus frame. If the user desires to view the movie, the user presses the action button on the remote control and the movie is then displayed on the screen in accordance with the Movies on Demand operational protocol.

Focus may be moved between control objects displayed on the display screen by navigating. The user navigates by moving a cursor or other visible indication of control to different objects displayed on the display screen. Navigating can be accomplished by tabbing or roaming. Tabbing refers to a mode in which user input from the remote control indicates movement on the display screen that is constrained to a control object defined by the application programmer. When tabbing, the user presses the directional control 116 one direction to move a cursor on the display screen. The software associated with the subscriber service being utilized moves the cursor to a control object displayed on the display screen that can accept focus. By contrast, roaming refers to a mode in which user input from the remote control indicates free movement of a cursor on the display screen in a specified direction. Typically, the user continues to press the directional control on the remote control in real-time until the cursor, or other object providing visual feedback, appears at the desired position.

When the user scrolls the list in one direction such that the first or last item in the list is displayed, the list preferably wraps-around such that the last item is immediately followed by the first item and the first item is followed by the last item. Thus, the list can be thought of as being endless and continuous. An alternative embodiment allows the list to stop scrolling when the first or last item has been displayed in the control object.

Figure 10:
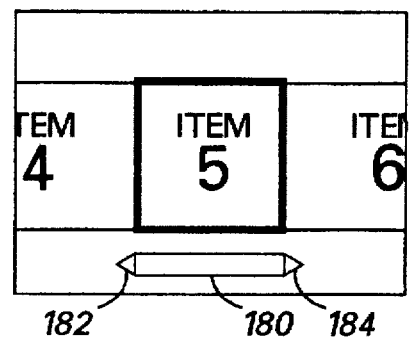
FIG. 10 is a list shown on the display screen in accordance with another embodiment of the present invention.
Figure 9:
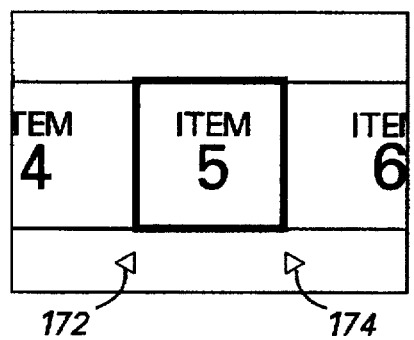
FIG. 9 is a list shown on the display screen in accordance with another embodiment of the present invention.

FIGS. 9 and 10 show alternative embodiments of the present invention. Both embodiments display the items in the list in the same manner as that shown in the preferred embodiment of FIG. 5. The embodiment shown in FIG. 9 includes two control objects in the form of arrows 172, 174. Each control object 172, 174 can accept focus, but only alternatively. Thus, the user can put focus on only one of the arrows at one time. When focus is on one of the arrows, the appearance of the arrow is modified is such a manner as to alert the user that the arrow has focus, similar to the thickened focus frame seen in FIG. 5.

Once focus is on one of the arrows, the user can scroll through the list and shift focus between arrows 172, 174 by manipulating the directional control 116 on the remote control. Thus, to scroll the list to the left the user must first put focus on the left arrow 172. With focus positioned on the left arrow 172, the list can only be scrolled to the left. To scroll the list to the left, the user presses the directional control on the remote control toward the left position 116c. To then scroll to the right, the user must first move focus from the left arrow 172 to the right arrow 174. This is accomplished by pressing the directional control 116 toward the right position 116d. Focus is then shifted to the right arrow 174, the display of which is altered in a manner to alert the user that the right arrow has focus. To scroll the list to the right, the user then presses the directional control to the right position 116d.

Similarly, the alternative embodiment shown in FIG. 10 places focus on the control object 180. However, focus is positioned on the entire control object 180 rather than on the individual directional arrow objects 182, 184. Thus, once focus is on the control object 180, the user need not shift focus between the left and right arrows 182, 184 to scroll left and right through the list. Once the user manipulates the remote control by tabbing or roaming to position focus on the control object 180, the user need not shift focus to scroll the list both left and right. The user merely pressing the directional control on the remote control left or right to scroll the fist left or right, respectively.

Figure 11:
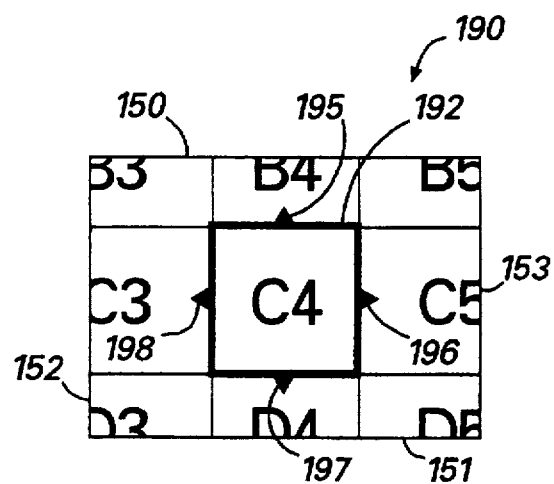
FIG. 11 is a grid shown on the display screen in accordance with another embodiment of the present invention.

Another embodiment of the present invention is shown in FIG. 11. FIG. 11 shows a two-dimensional grid 190 in which all list items displayed at the borders of the display screen are only partially displayed. This communicates to the user that the grid includes additional items in each direction beyond those shown in the display.

The grid includes a focus frame 192 on a fully displayed item near the center of the display. The focus frame can be either static or dynamic, as described above with reference to FIGS. 5 and 8. The grid may also include a control object located at another portion of the display screen for accepting focus that the user can then manipulate to scroll the list.

As shown in FIG. 11, arrow tabs 195, 196, 197, 198 can be appended to each side of the focus frame to supply the user with a visual indication of the directions that the user can scroll the items in the displayed list. When the user operates the directional control on the remote control to scroll the list left, right, up, or down, the items preferably "crawl" smoothly in unison into the new positions, i.e., the items do not "jump" into the new positions. Alteratively, the items may "jump" from one position to the appropriate adjacent position.

Figure 12:
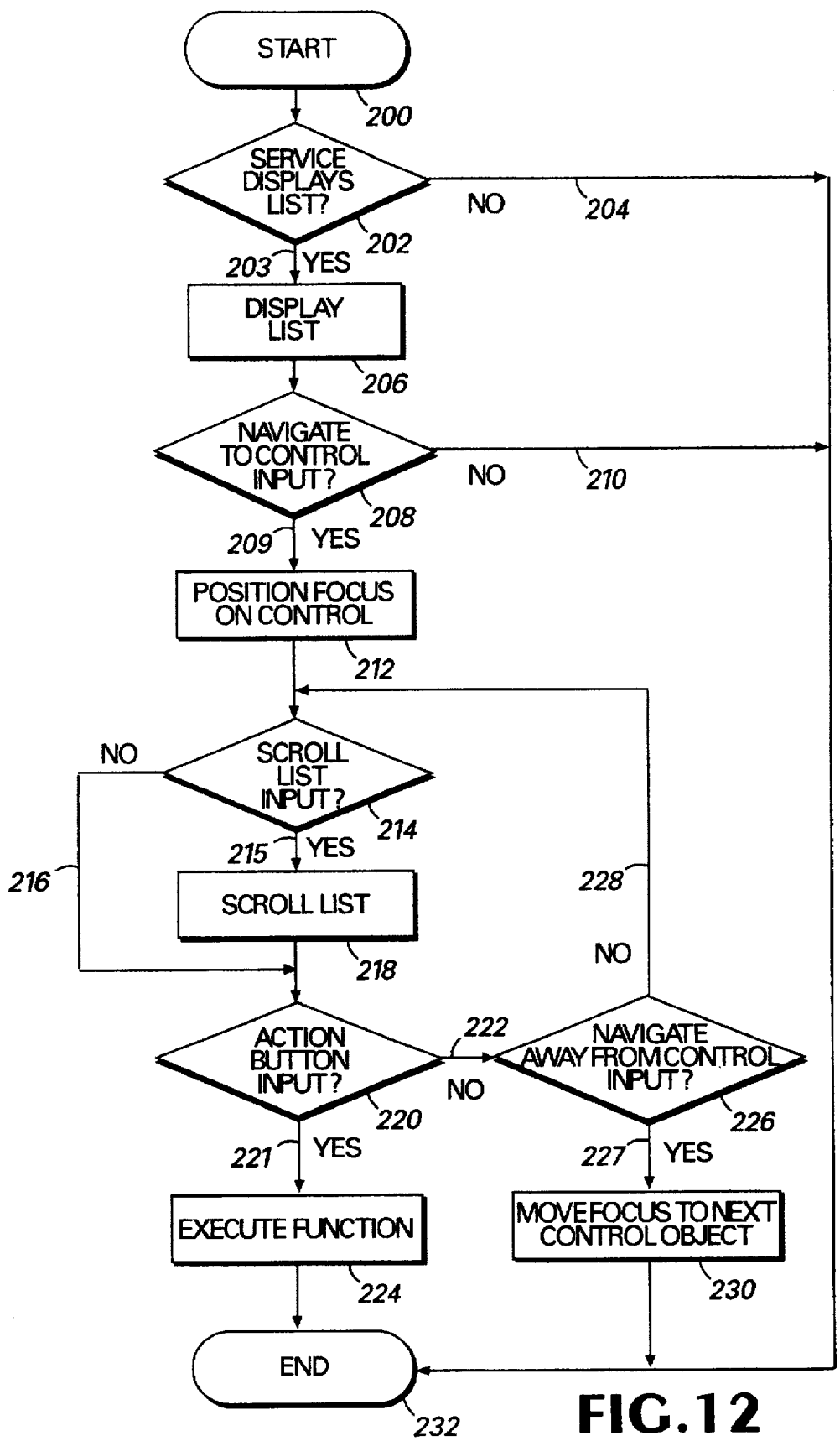
FIG. 12 is a flow chart of the steps required to display and operate the partial scrolling list in accordance with the present invention.

FIG. 12 is a flow chart illustrating the method for displaying and scrolling the list on a display screen in accordance with an interactive network system. The method described in FIG. 12 is implemented via software in the remote control unit and the set-top terminal in conjunction with application software associated with the subscriber service being utilized by the user.

The method begins at 200. At step 202, software in the set-top terminal determines whether a list, associated with the particular subscriber service, is to be displayed. If so, the method follows "yes" branch 203 to step 206, where the list is displayed in a control object on the display screen. If no list is to be displayed, the method follows "no" branch 204 and the method terminates at 232.

When the list is displayed on the display screen at step 206, the method then determines whether the user has manipulated the remote control to navigate to the control object that controls the scrolling of the list. If the user has navigated to the control object that controls scrolling, the method follows "yes" branch 209 to step 212, where focus is positioned on the control object. If the user has not navigated to the control object, the method terminates at 232.

At step 214, the method determines whether the user has manipulated the directional control on the remote control to initiate scrolling of the list displayed in the control object. If the set-top terminal receives input from the remote control that the user has operated the remote control to initiate scrolling of the list, the method follows "yes" branch 215 to step 218, where the method scrolls the list in accordance with the user's command. It should be understood that all items in the list can be scrolled via steps 214 and 218, in accordance with the user's manipulation of the directional control on the remote control. Thus, via steps 214 and 218, the user can scroll through as much or as little of the list as is required until the desired item is displayed in the control object. If the user has not manipulated the remote control to initiate scrolling, the method follows "no" branch 216 to step 220.

At step 220, the set-top terminal software determines whether the user has pressed the action button on the remote control. If the action button has been pressed, the method follows "yes" branch 221 to step 224, where the associated function is executed. The method then terminates at 232. If the action button has not been pressed, the method follows "no" branch 222 to step 226.

At step 226, it is determined whether the user has navigated away from the control object that controls the list. If the user has navigated away by manipulating the directional control of the remote control, the method follows "yes" branch 227 to step 230, where focus is moved to the next neighboring control object on the display screen in accordance with the user's input. The method then terminates at 232. If the user has not navigated away from the list control, the method follows "no" branch 228 and return to step 214 to determine whether the user continues scrolling through the list.

In summary, the present invention provides a system for displaying a list of multiple items containing information or alternative choices associated with a subscriber service of an interactive network system. At least one item in the list is displayed in its entirety. The items at the border of the list are only partially displayed to give the user an indication that the list extends beyond the borders of the list. Additional list items can be displayed by scrolling the list by manipulating a directional control on a remote control unit that operates in conjunction with a set-top terminal of the interactive system. An item in the list, or another control object on the display screen, is highlighted in a manner to give the user a visible indication that the list can be scrolled, or shifted, within the display to display new items in the list and remove previously displayed items.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. In connection with an interactive network system, a method for displaying a plurality of items in a list on a display screen, comprising the steps of:

displaying a first control object on said display screen;

displaying a list comprising at least three alteratively selectable items in said first control object, wherein at least one item is displayed in its entirety within said first control object, and wherein each item displayed at a border of said first control object is only partially displayed;

scrolling through the list of items based on input from a user of the interactive network system; and accepting the selection of one of the plurality of items displayed in the list based on input from a user of the interactive network system.

2. The method of claim 1 further comprising displaying a focus frame within said first control object, said focus frame operative to supply a visual indication of user control of the list displayed in said fist control object.

3. The method of claim 2 wherein said focus frame is positioned on one item displayed in said first control object.

4. The method of claim 3 wherein said visual indication includes an altered border surrounding said item.

5. The method of claim 3 wherein said visual indication includes displaying said item in a different color than surrounding items.

6. The method of claim 3 wherein said visual indication includes displaying graphics associated with said item.

7. The method of claim 3 wherein said visual indication includes magnification of said item compared to surrounding items.

8. The method of claim 3 wherein said items in said list can be scrolled through said focus frame.

9. The method of claim 8 wherein said focus frame includes a visual indication that the items in the list can be scrolled through said focus frame in a specified direction.

10. The method of claim 9 wherein said visual indication includes arrow tabs appended to said focus frame.

11. The method of claim 9 wherein said focus frame is static and remains in a constant position relative to said first control object.

12. The method of claim 9 wherein said focus frame is dynamic and shifts relative to said first control object.

13. The method of claim 1 wherein said first control object extends to at least two borders of said display screen.

14. The method of claim 1 wherein said first control object displays items in a two dimensional grid, wherein at least two items displayed at two borders of said first control object are only partially displayed.

15. The method of claim 3 further comprising the steps of:

scrolling items in the list through said focus frame until a desired item is displayed within said focus frame; and selecting said item within said focus frame to initiate a function associated with said item.

16. The method of claim 1 further comprising displaying a second and third control object, each said second and third control object being able to alternatively accept focus for controlling scrolling of items in said list.

17. The method of claim 16 wherein said second control object controls scrolling of items in said list in a first direction and said third control object controls scrolling of items in said list in a second direction.

18. The method of claim 1 further comprising displaying a second control object, said second control object being able to accept focus for controlling scrolling of items in said list in each direction.

19. A system, in connection with an interactive network system, for displaying a plurality of items in a list on a television display screen, comprising:

a first control object displayed on said display screen; and a list, including at least three alternatively selectable items, displayed in said first control object, wherein at least one item is displayed in its entirety within said first control object, and wherein each item displayed at a border of said first control object is only partially displayed;

wherein the items in the list can be scrolled based on input from a user of the interactive network system and wherein one of the plurality of items displayed in the list can be selected based on input from a user of the interactive network system.

20. The system of claim 19 further comprising a focus frame displayed within said first control object, said focus frame operative to supply a visual indication of user control of the list displayed in said first control object.

21. The system of claim 20 wherein said focus frame is positioned on one item displayed in said first control object.

22. The system of claim 21 wherein said visual indication includes an altered border surrounding said item.

23. The system of claim 21 wherein said visual indication includes displaying said item in a different color than surrounding items.

24. The system of claim 21 wherein said visual indication includes displaying graphics associated with said item.

25. The system of claim 21 wherein said visual indication includes magnification of said item compared to surrounding items.

26. The system of claim 21 wherein said items in said list can be scrolled through said focus frame.

27. The system of claim 26 wherein said focus frame includes a visual indication that the items in the list can be scrolled through said focus frame in a specified direction.

28. The system of claim 27 wherein said visual indication includes arrow tabs appended to said focus frame.

29. The system of claim 27 wherein said focus frame is static and remains in a constant position relative to said first control object.

30. The system of claim 27 wherein said focus frame is dynamic and shifts relative to said first control object.

31. The system of claim 19 wherein said first control object extends to at least two borders of said display screen.

32. The system of claim 19 wherein said first control object displays items in a two dimensional grid, wherein at least two items displayed at two borders of said first control object are only partially displayed.

33. The system of claim 21 wherein said items in said list can be scrolled through said focus frame and selected by a user of said interactive network system manipulating a remote control unit operatively connected to said interactive network system.

34. The system of claim 19 further comprising a second and third control object displayed on said display screen, each said second and third control object being able to alternatively accept focus for controlling scrolling of items in said list.

35. The system of claim 34 wherein said second control object controls scrolling of items in said list in a first direction and said third control object controls scrolling of items in said list in a second direction.

36. The system of claim 19 further comprising a second control object displayed on said display screen, said second control object being able to accept focus for controlling scrolling of items in said list in each direction.

37. The system of claim 34 wherein focus can be moved between control objects by a user of said interactive network system manipulating a remote control unit operatively connected to said interactive network system.

38. The system of claim 36 wherein focus can be moved between control objects by a user of said interactive network system manipulating a remote control unit operatively connected to said interactive network system.

39. A computer-readable medium on which is stored a program for displaying a plurality of items in a list on a display screen in connection with an interactive network system, the program comprising instructions which, when executed by the computer, perform the steps of:

displaying a first control object on said display screen;

displaying a list comprising at least three alternatively selectable items in said first control object, wherein at least one item is displayed in its entirety within said first control object, and wherein each item displayed at a border of said first control object is only partially displayed;

scrolling through the list of items based on input from a user of the interactive network system; and accepting the selection of one of the plurality of items displayed in the list based on input from a user of the interactive network system.

40. The medium of claim 39 further comprising displaying a focus frame within said first control object, said focus frame operative to supply a visual indication of user control of the list displayed in said first control object.

41. The medium of claim 40 wherein said visual indication includes an altered border surrounding said item.

42. The medium of claim 40 wherein said focus frame includes a visual indication that the items in the list can be scrolled through said focus frame in a specified direction.

43. The medium of claim 39 wherein said first control object displays items in a two dimensional grid, wherein each item displayed at the borders of said first control object are only partially displayed.

44. The medium of claim 39 further comprising displaying a second and third control object, each said second and third control object being able to alternatively accept focus for controlling scrolling of items in said list.

* * * * *

UNITED STATES PATENT AND TRADEMARK OFFICE
CERTIFICATE OF CORRECTION

PATENT NO. : 5,677,708

DATED : OCTOBER 14, 1997

INVENTOR(S) : JOSEPH H. MATTHEWS, III
JOGENE KAPELL AND
KEITH LINDSEY ROWE

It is certified that error appears in the above-identified patent and that said Letters Patent is hereby corrected as shown below:

In column 19, line 13, claim 2, please delete [fist] and insert in place thereof --first--

Signed and Sealed this

Twenty-third Day of March, 1999

Attest:

Attesting Officer

Q. TODD DICKINSON

Acting Commissioner of Patents and Trademarks

(12) EX PARTE REEXAMINATION CERTIFICATE (8959th)
United States Patent
Matthews, III et al.

(10) Number: US 5,677,708 C1
(45) Certificate Issued: Apr. 17, 2012

(54) SYSTEM FOR DISPLAYING A LIST ON A DISPLAY SCREEN

(75) Inventors: Joseph H. Matthews, III, Redmond, WA (US); JoGene Kapell, Bellevue, WA (US); Keith Lindsey Rowe, Seattle, WA (US)

(73) Assignee: Microsoft Corporation, Redmond, WA (US)

Reexamination Request:
No. 90/011,538, Mar. 7, 2011

Reexamination Certificate for:
| | |
|---|---|
| Patent No.: | 5,677,708 |
| Issued: | Oct. 14, 1997 |
| Appl. No.: | 08/435,292 |
| Filed: | May 5, 1995 |

Certificate of Correction issued Mar. 23, 1999.

(51) Int. Cl.
*H04N 7/173* (2006.01)
*G09G 3/02* (2006.01)

(52) U.S. Cl. .................. 715/830; 715/828; 715/829; 725/52

(58) Field of Classification Search ...................... None
See application file for complete search history.

(56) References Cited

To view the complete listing of prior art documents cited during the proceeding for Reexamination Control Number 90/011,538, please refer to the USPTO's public Patent Application Information Retrieval (PAIR) system under the Display References tab.

*Primary Examiner* — Joshua Campbell

(57) ABSTRACT

A system for displaying a list of items containing information or alternative choices associated with a subscriber service of an interactive network system. At least one item in the list is displayed in its entirety. The items at the border of the list are only partially displayed to give the user an indication that the list extends beyond the borders of the list. Additional list items can be displayed by scrolling the list by manipulating a directional control on a remote control unit that operates in conjunction with a set-top terminal of the interactive system. An item in the list, or another control object on the display screen, is highlighted in a manner to give the user a visible indication that the list can be scrolled, or shifted, within the display to display new items in the list and remove previously displayed items.

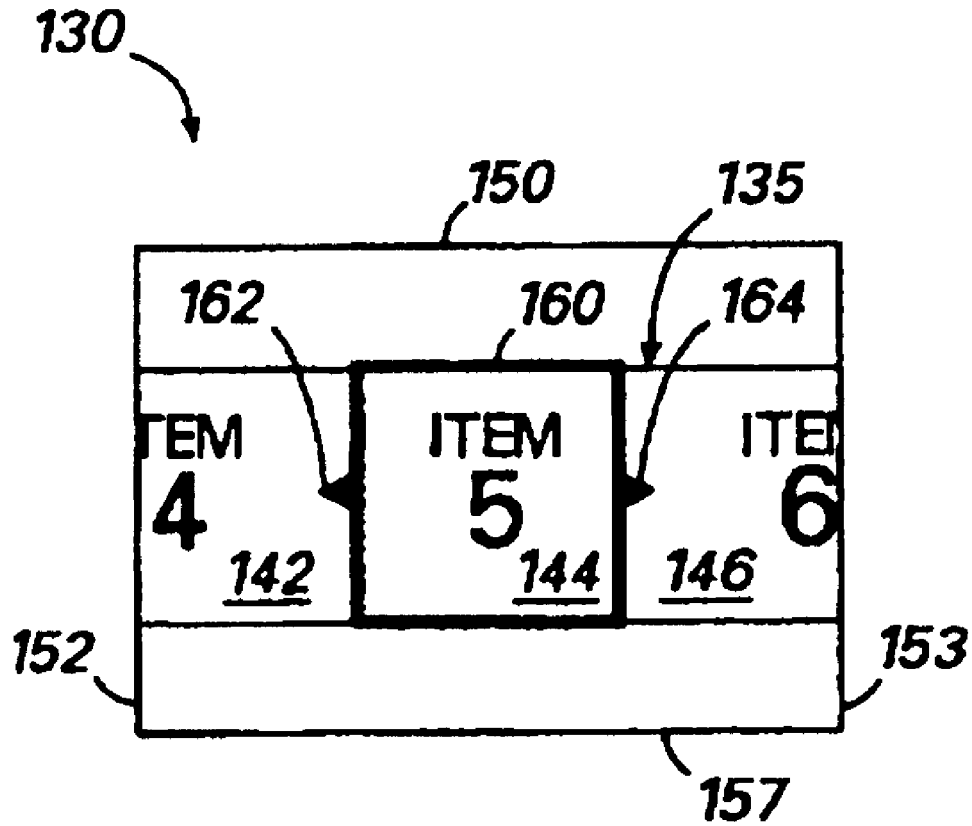

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 19 and 39 are determined to be patentable as amended.

Claims 3-6, 8-15, 20-24, 26-35 and 40-44 dependent on an amended claim, are determined to be patentable.

New claims 45-92 are added and determined to be patentable.

Claims 7, 16-18, 25 and 36-38 were not reexamined.

1. In connection with an interactive network system, a method for displaying a plurality of items in a list on a display screen, comprising the steps of:
   displaying a first control object on said display screen;
   displaying a list comprising at least three [alteratively] *alternatively* selectable items in said first control object, wherein at least one item is displayed in its entirety within said first control object, and wherein each item displayed at a border of said first control object is only partially displayed;
   scrolling through the list of items based on input from a user of the interactive network system; [and]
   accepting the selection of one of the plurality of items displayed in the list based on input from a user of the interactive network system; *and*
   *displaying a plurality of control objects on the display screen;*
   *moving a focus between the first control object and an individual control object of the plurality of control objects according to a pre-defined order in response to input from a user of the interactive network system.*

2. The method of claim 1 further comprising displaying a focus frame within said first control object, said focus frame operative to supply a visual indication of user control of the list displayed in said [fist] *first* control object.

19. A system, in connection with an interactive network system, for displaying a plurality of items in a list on a television display screen, comprising:
   a first control object displayed on said display screen; [and]
   *a plurality of control objects displayed on the display screen; and*
   a list, including at least three alternatively selectable items, displayed in said first control object, wherein at least one item is displayed in its entirety within said first control object, and wherein each item displayed at a border of said first control object is only partially displayed;
   wherein the items in the list can be scrolled based on input from a user of the interactive network system and wherein one of the plurality of items displayed in the list can be selected based on input from a user of the interactive network system; *and*
   *wherein a focus can be moved between the first control object and an individual control object of the plurality of control objects according to a pre-defined order in response to input from a user of the interactive network system.*

39. A computer-readable medium on which is stored a program for displaying a plurality of items in a list on a display screen in connection with an interactive network system, the program comprising instructions which, when executed by the computer, perform the steps of:
   displaying a first control object on said display screen;
   displaying a list comprising at least three alternatively selectable items in said first control object, wherein at least one item is displayed in its entirety within said first control object, and wherein each item displayed at a border of said first control object is only partially displayed;
   scrolling through the list of items based on input from a user of the interactive network system; [and]
   accepting the selection of one of the plurality of items displayed in the list based on input from a user of the interactive network system; *and*
   *displaying a plurality of control objects on the display screen;*
   *moving a focus between the first control object and an individual control object of the plurality of control objects according to a pre-defined order in response to input from a user of the interactive network system.*

*45. The method of claim 1 wherein at least some of the selectable items correspond to individual program items associated with subscriber services provided through the interactive network system.*

*46. The method of claim 45 wherein the program items are at least one of audio program items, video program items, or software applications.*

*47. The method of claim 1 wherein the interactive network system comprises a two-way communications network.*

*48. The method of claim 1 wherein the border of the first control object is displayed at least partially within a predetermined outer area of the display screen, the predetermined outer area at least partially enclosing an inner area of the display screen.*

*49. In connection with an interactive network system, a method for displaying a plurality of items in a list on a display screen, comprising the steps of:*
   *displaying a first control object on said display screen;*
   *displaying a list comprising at least three alternatively selectable items in said first control object, wherein at least one item is displayed in its entirety within said first control object, and wherein each item displayed at a border of said first control object is only partially displayed;*
   *scrolling through the list of items based on input from a user of the interactive network system, wherein the scrolling includes wrapping the list around such that a last item of the list is followed by a first item of the list or the first item of the list is followed by the last item of the list; and*
   *accepting the selection of one of the plurality of items displayed in the list based on input from a user of the interactive network system.*

*50. The method of claim 49 further comprising displaying a focus frame within said first control object, said focus*

*frame operative to supply a visual indication of user control of the list displayed in said first control object.*

*51. The method of claim 50 wherein said focus frame is positioned on one item displayed in said first control object.*

*52. The method of claim 51 wherein said visual indication includes an altered border surrounding said item.*

*53. The method of claim 51 wherein said visual indication includes displaying said item in a different color than surrounding items.*

*54. The method of claim 51 wherein said visual indication includes displaying graphics associated with said item.*

*55. The method of claim 51 wherein said visual indication includes magnification of said item compared to surrounding items.*

*56. The method of claim 51 wherein said items in said list can be scrolled through said focus frame.*

*57. The method of claim 56 wherein said focus frame includes a visual indication that the items in the list can be scrolled through said focus frame in a specified direction.*

*58. The method of claim 57 wherein said visual indication includes arrow tabs appended to said focus frame.*

*59. The method of claim 57 wherein said focus frame is static and remains in a constant position relative to said first control object.*

*60. The method of claim 57 wherein said focus frame is dynamic and shifts relative to said first control object.*

*61. The method of claim 49 wherein said first control object extends to at least two borders of said display screen.*

*62. The method of claim 49 wherein said first control object displays items in a two dimensional grid, wherein at least two items displayed at two borders of said first control object are only partially displayed.*

*63. The method of claim 51 further comprising the steps of:*

*scrolling items in the list through said focus frame until a desired item is displayed within said focus frame; and*

*selecting said item within said focus frame to initiate a function associated with said item.*

*64. The method of claim 49 further comprising displaying a second and third control object, each said second and third control object being able to alternatively accept focus for controlling scrolling of items in said list.*

*65. The method of claim 64 wherein said second control object controls scrolling of items in said list in a first direction and said third control object controls scrolling of items in said list in a second direction.*

*66. The method of claim 49 further comprising displaying a second control object, said second control object being able to accept focus for controlling scrolling of items in said list in each direction.*

*67. A system, in connection with an interactive network system, for displaying a plurality of items in a list on a television display screen, comprising:*

*a first control object displayed on said display screen;*

*a plurality of control objects displayed on the display screen; and*

*a list, including at least three alternatively selectable items, displayed in said first control object, wherein at least one item is displayed in its entirety within said first control object, and wherein each item displayed at a border of said first control object is only partially displayed;*

*wherein the items in the list can be scrolled based on input from a user of the interactive network system and wherein one of the plurality of items displayed in the list can be selected based on input from a user of the interactive network system; and*

*wherein a focus can be moved between the first control object and an individual control object of the plurality of control objects according to a pre-defined order in response to input from a user of the interactive network system.*

*68. The system of claim 67 further comprising a focus frame displayed within said first control object, said focus frame operative to supply a visual indication of user control of the list displayed in said first control object.*

*69. The system of claim 68 wherein said focus frame is positioned on one item displayed in said first control object.*

*70. The system of claim 69 wherein said visual indication includes an altered border surrounding said item.*

*71. The system of claim 69 wherein said visual indication includes displaying said item in a different color than surrounding items.*

*72. The system of claim 69 wherein said visual indication includes displaying graphics associated with said item.*

*73. The system of claim 69 wherein said visual indication includes magnification of said item compared to surrounding items.*

*74. The system of claim 69 wherein said items in said list can be scrolled through said focus frame.*

*75. The system of claim 74 wherein said focus frame includes a visual indication that the items in the list can be scrolled through said focus frame in a specified direction.*

*76. The system of claim 75 wherein said visual indication includes arrow tabs appended to said focus frame.*

*77. The system of claim 75 wherein said focus frame is static and remains in a constant position relative to said first control object.*

*78. The system of claim 75 wherein said focus frame is dynamic and shifts relative to said first control object.*

*79. The system of claim 67 wherein said first control object extends to at least two borders of said display screen.*

*80. The system of claim 67 wherein said first control object displays items in a two dimensional grid, wherein at least two items displayed at two borders of said first control object are only partially displayed.*

*81. The system of claim 69 wherein said items in said list can be scrolled through said focus frame and selected by a user of said interactive network system manipulating a remote control unit operatively connected to said interactive network system.*

*82. The system of claim 67 further comprising a second and third control object displayed on said display screen, each said second and third control object being able to alternatively accept focus for controlling scrolling of items in said list.*

*83. The system of claim 82 wherein said second control object controls scrolling of items in said list in a first direction and said third control object controls scrolling of items in said list in a second direction.*

*84. The system of claim 67 further comprising a second control object displayed on said display screen, said second control object being able to accept focus for controlling scrolling of items in said list in each direction.*

*85. The system of claim 82 wherein focus can be moved between control objects by a user of said interactive network system manipulating a remote control unit operatively connected to said interactive network system.*

*86. The system of claim 84 wherein focus can be moved between control objects by a user of said interactive network system manipulating a remote control unit operatively connected to said interactive network system.*

*87. A computer-readable medium on which is stored a program for displaying a plurality of items in a list on a* display screen in connection with an interactive network system, the program comprising instructions which, when executed by the computer, perform the steps of:

displaying a first control object on said display screen;

displaying a list comprising at least three alternatively selectable items in said first control object, wherein at least one item is displayed in its entirety within said first control object, and wherein each item displayed at a border of said first control object is only partially displayed;

scrolling through the list of items based on input from a user of the interactive network system;

accepting the selection of one of the plurality of items displayed in the list based on input from a user of the interactive network system; and displaying a plurality of control objects on the display screen;

moving a focus between the first control object and an individual control object of the plurality of control objects according to a pre-defined order in response to input from a user of the interactive network system.

88. The medium of claim 87 further comprising displaying a focus frame within said first control object, said focus frame operative to supply a visual indication of user control of the list displayed in said first control object.

89. The medium of claim 88 wherein said visual indication includes an altered border surrounding said item.

90. The medium of claim 88 wherein said focus frame includes a visual indication that the items in the list can be scrolled through said focus frame in a specified direction.

91. The medium of claim 87 wherein said first control object displays items in a two dimenstional grid, wherein each item displayed at the borders of said first control object are only partially displayed.

92. The medium of claim 87 further comprising displaying a second and third control object, each said second and third control object being able to alternatively accept focus for controlling scrolling of items in said list.

\* \* \* \* \*